(12) United States Patent
Rae et al.

(10) Patent No.: US 8,098,804 B1
(45) Date of Patent: Jan. 17, 2012

(54) SYSTEMS AND METHODS FOR CALL TREATMENT USING A THIRD PARTY DATABASE

(75) Inventors: Robert L. Rae, Plano, TX (US); John J. Viola, Frisco, TX (US); Richard Falcone, Addison, TX (US)

(73) Assignee: Securus Technologies, Inc., Dallas, TX (US)

( * ) Notice: Subject to any disclaimer, the term of this patent is extended or adjusted under 35 U.S.C. 154(b) by 1399 days.

(21) Appl. No.: 11/562,800

(22) Filed: Nov. 22, 2006

Related U.S. Application Data

(63) Continuation-in-part of application No. 10/135,878, filed on Apr. 29, 2002, now abandoned.

(51) Int. Cl.
*H04M 1/56* (2006.01)
(52) U.S. Cl. .......... 379/142.05; 379/88.02; 379/88.19; 379/88.2; 379/88.21; 379/93.03; 379/207.13; 379/207.14; 379/207.15; 379/142.06; 379/142.23; 370/278; 370/282; 370/395.2
(58) Field of Classification Search .......... 379/29.09, 379/114.23, 121.04, 142.06, 201.1, 88.02, 379/88.19, 88.2, 88.21, 93.03, 207.13, 207.14, 379/207.15; 705/1; 370/278, 282, 395.2
See application file for complete search history.

(56) References Cited

U.S. PATENT DOCUMENTS

| | | | |
|---|---|---|---|
| 5,185,781 A | 2/1993 | Dowden et al. | |
| 5,210,789 A | 5/1993 | Jeffus et al. | |
| 5,345,501 A | 9/1994 | Shelton | |
| 5,485,507 A | 1/1996 | Brown et al. | |
| 5,517,555 A | 5/1996 | Amadon et al. | |
| 5,627,887 A | 5/1997 | Freedman | |
| 5,655,013 A * | 8/1997 | Gainsboro | 379/188 |
| 5,832,068 A | 11/1998 | Smith | |
| 5,861,810 A * | 1/1999 | Nguyen | 340/573.4 |
| 5,915,001 A | 6/1999 | Uppaluru | |
| 5,926,533 A | 7/1999 | Gainsboro | |
| 5,937,035 A | 8/1999 | Andruska et al. | |
| 6,038,315 A | 3/2000 | Strait et al. | |
| 6,058,163 A | 5/2000 | Pattison et al. | |
| 6,072,860 A | 6/2000 | Kek et al. | |
| 6,118,860 A | 9/2000 | Hillson et al. | |
| 6,173,284 B1 | 1/2001 | Brown | |
| 6,175,831 B1 | 1/2001 | Weinreich et al. | |
| 6,308,171 B1 | 10/2001 | De La Huerga | |

(Continued)

OTHER PUBLICATIONS

U.S. Appl. No. 09/640,831, Bobb Swope.

(Continued)

*Primary Examiner* — Melur Ramahrishnaiah
*Assistant Examiner* — Yosef K Laekemariam
(74) *Attorney, Agent, or Firm* — Fogarty, L.L.C.

(57) ABSTRACT

Systems and methods which detect unauthorized, impermissible, or otherwise undesired call activity through the use of one or more third party databases are shown. For example, a controlled environment facility information management system may access a database external thereto, such as a victim notification database, which is created and maintained by a third party unrelated to the controlled environment facility. Such third party database access may be accomplished at the point of call validation or caller verification for determining the treatment of the call (e.g., allowed, blocked, allowed with limitations, etcetera). Such call treatment determinations may be made with respect a particular prisoner or other resident of the controlled environment facility making the call, may be made with respect to all calls made from a particular controlled environment facility, may be made with respect to a group of controlled environment facilities, etcetera.

31 Claims, 4 Drawing Sheets

U.S. PATENT DOCUMENTS

| | | | |
|---|---|---|---|
| 6,639,978 | B2 | 10/2003 | Drainzin et al. |
| 6,665,376 | B1 | 12/2003 | Brown |
| 6,668,045 | B1 | 12/2003 | Mow |
| 6,688,518 | B1 | 2/2004 | Valencia et al. |
| 6,768,792 | B2 * | 7/2004 | Brown et al. ............ 379/207.14 |
| 6,782,370 | B1 | 8/2004 | Stack |
| 6,920,209 | B1 | 7/2005 | Gainsboro |
| 6,947,525 | B2 | 9/2005 | Benco |
| 7,039,171 | B2 | 5/2006 | Gickler |
| 7,075,919 | B1 | 7/2006 | Wendt et al. |
| 7,079,636 | B1 | 7/2006 | McNitt et al. |
| 7,079,637 | B1 | 7/2006 | McNitt et al. |
| 7,106,843 | B1 | 9/2006 | Gainsboro et al. |
| 7,124,438 | B2 * | 10/2006 | Judge et al. ...................... 726/22 |
| 7,133,845 | B1 | 11/2006 | Ginter et al. |
| 2001/0036821 | A1 | 11/2001 | Gainsboro et al. |
| 2001/0043697 | A1 | 11/2001 | Cox et al. |
| 2002/0046057 | A1 | 4/2002 | Ross |
| 2002/0067272 | A1 | 6/2002 | Lemelson et al. |
| 2002/0069084 | A1 | 6/2002 | Donovan |
| 2002/0107871 | A1 | 8/2002 | Wyzga et al. |
| 2002/0147707 | A1 | 10/2002 | Kraay et al. |
| 2003/0002639 | A1 | 1/2003 | Huie |
| 2003/0023874 | A1 | 1/2003 | Prokupets et al. |
| 2003/0070076 | A1 | 4/2003 | Michael |
| 2003/0093533 | A1 | 5/2003 | Ezerzer et al. |
| 2003/0099337 | A1 | 5/2003 | Lord |
| 2003/0126470 | A1 | 7/2003 | Crites et al. |
| 2003/0174826 | A1 | 9/2003 | Hesse |
| 2003/0190045 | A1 | 10/2003 | Huberman et al. |

OTHER PUBLICATIONS

U.S. Appl. No. 09/640,999, Bobb Swope.
U.S. Appl. No. 09/995,253-A1, H. Lord.
U.S. Appl. No. 10/022,946-A1, Nadia Draizin.
U.S. Appl. No. 60/324,227, Michael Lord.
U.S. Appl. No. 10/135,883-A1, Richard Falcone.
Dye, Charles, "Oracle Distributed Systems," O'Reilly Media, Inc., Apr. 1, 1999.
McCollum, "Federal Prisoner Health Care Copayment Act of 2000," House of Representatives Report 106-851, 106th Congress 2d Session, Sep. 14, 2000.
Fischer, Alan D., "COPLINK nabs criminals faster," Arizona Daily Star, Jan. 7, 2001.
Wilkinson, Reginald A., "Visting in Prison," Prison and Jail Administration's Practices and Theory, 1999.
Chad, Michael, "Building an Infrastructure for Law Enforcement Information Sharing and Collaboration: Design Issues and Challenges," National Conference on Digital Government, Short Paper, 2001.
Hauck, Roslin V., "Coplink: A Case of Intelligent Analysis and Knowledge Management," Proceedings of the International Conference on Information Systems, pp. 15-28, Dec. 1999.
i2 Investigative Analysis Software, "i2 Text Chart—Text Visualized" URL: http://www.i2.co.uk/Products/i2TextChart/, Jun. 13, 2005.
i2 Investigative Analysis Software, "i2 iBase—Information Captured," URL: http://www.i2.co.uk/Products/iBase/, Jun. 13, 2005.
i2 Investigative Analysis Software, "iBridge," URL: http://www.i2.co.uk/Products/iBridge/, Jun. 13, 2005.
i2 3Investigative Analysis Software, "Chart Reader," URL: http://www.i2.co.uk/Products/Chart_Reader/, Jun. 13, 2005.
i2 Investigative Analysis Software, "Pattern Tracer," URL: http://www.i2.co.uklProducts/Pattern_Tracer/, Jun. 13, 2005.
i2 Investigative Analysis Software, "Prisons," URL: http://www.i2.co.uk/Products/Prisons/default.asp, Jun. 13, 2005.
i2 Investigative Analysis Software, "Setting International Standards for Investigative Analysis," URL: http://www.i2.co.uk/Products/index.htm, Jun. 13, 2005.
Microsoft, "Integrated Justice Information Systems (IJIS): An Overview," retrieved from Microsoft Justice & Public Safety Solutions website, URL: http://jps.directlaps.net/_vti_bin/owssvr.dll?Using=Default%2ehtm, Nov. 5, 2002.
Imagis Technologies Inc., "CABS—Computerized Arrest and Booking System," URL: http://www.imagistechnologies.com/Product/CABS.htm, Nov. 5, 2002.
lmagis Technologies Inc., "Integrated Justice System—Web based Image and Data Sharing," URL: http://www.imagistechnologies.com/Product/IJISFramework.htm, Nov. 5, 2002.
O'Harrow, Robert, Jr., U.S. Backs Florida's New Counterterrorism Database: 'Matrix' Offers Law Agencies Faster Access to Americans' Personal Records, The Washington Post, Aug. 6, 2003, p. A.01.
O'Harrow, Robert, Jr., "Database will make tracking suspected terrorists easier," The Dallas Morning News, Aug. 6, 2003, p. 7A.

* cited by examiner

SYSTEMS AND METHODS FOR CALL TREATMENT USING A THIRD PARTY DATABASE

RELATED APPLICATIONS

The present invention is a continuation-in-part of co-pending and commonly assigned U.S. patent application Ser. No. 10/135,878 entitled "Information Management and Movement System and Method." The present invention is related to co-pending and commonly assigned U.S. patent application Ser. No. 11/182,625 entitled "Systems and Methods for Acquiring, Accessing, and Analyzing Investigative Information," Ser. No. 10/947,986 entitled "Optimizing Profitability in Business Transactions," and Ser. No. 10/646,638 entitled "System and Method for Remote Call Forward Detection and Treatment," the disclosures of each of which are hereby incorporated by reference in their entirety.

TECHNICAL FIELD

The present invention is related generally to telephony and, more particularly, to detecting unauthorized or undesired calling activity.

BACKGROUND OF THE INVENTION

Information management is becoming an increasingly critical key to the effective management of institutions and commercial enterprises. The information may relate to services, products, facilities, consumers, or staff, but it needs to be managed and moved effectively if use of resources is to be optimized and/or profits are to be maximized.

The information needed to effectively and efficiently manage and operate a controlled environment, such as an inmate facility, may reflect the unique requirements of such a facility. There is often a need to facilitate both management of various aspects of the facilities and complete transactions associated with the facilities on a continuing basis, thus requiring the management and movement of large amounts of data. However, automation of management aspects of such controlled environment facilities has been limited and integration of various different management functions has been even less prevalent. Moreover, there has been little, if any, interaction with respect to facility management and transaction completion in controlled environment settings.

For example, in a prison setting it may be desirable to prevent a prisoner from calling particular parties, such as victims, judges, prosecuting attorneys, and the like, although such prisoners may be granted the privilege of calling friends and families. Although it may be possible to implement logic in a prison phone system to prevent a prisoner from directly calling particular identified numbers or allowing a prisoner to call only particular identified numbers, it is a daunting task to obtain such numbers, ensure the accuracy of the numbers, update the numbers, etcetera. Accordingly, a prison or other controlled environment facility inputting and maintaining a list of numbers one or more inmates or residents are prevented from calling has been costly and somewhat ineffective.

Accordingly, a need exists in the art for an effective information management system for use with respect to a controlled environment facility that can effectively and efficiently detect unauthorized or undesired calling activity, such as to control calls from inmates or other residents of controlled environment facilities to victims, judges, prosecuting attorneys, and the like.

BRIEF SUMMARY OF THE INVENTION

The present invention is directed to systems and methods which detect unauthorized, impermissible, or otherwise undesired call activity through the use of one or more third party databases. For example, a controlled environment facility information management system adapted according to an embodiment of the present invention may access a database external thereto, which is created and maintained by a third party unrelated to the controlled environment facility. Such third party database access may be accomplished at the point of call validation or caller verification for determining the treatment of the call (e.g., allowed, blocked, allowed with limitations, etcetera). Such call treatment determinations may be made with respect a particular prisoner or other resident of the controlled environment facility making the call, may be made with respect to all calls made from a particular controlled environment facility, may be made with respect to a group of controlled environment facilities, etcetera.

Third party databases utilized in detecting undesired call activity according to embodiments of the present invention are created and maintained by third parties for purposes other than use in detecting undesired call activity. For example, embodiments of the invention utilize a victim notification database, such as may be created and maintained by a third party to provide notifications to victims regarding the status (e.g., release) of a particular prisoner, to identify calls directed to crime victims.

Information available to the third party database may directly identify the victim, such as by telephone number, full name, etcetera. This information may be used to directly match an attempted call, perhaps using additional information sources such as the line information database (LIDB) or billing name and address (BNA) information, to a victim. However, third party databases may be used to provide information less directly identifying a geographic arm of a victim, a telephone exchange of a victim, a victim's last name and first initial for identification of similar names, etcetera. Embodiments of the invention use such other information to identify cells to individuals other than the victim or other individual which is the subject of the database record. For example, a victim notification database may include information regarding legal counsel, a judge presiding over the matter, etcetera. Such information may be used in making call treatment determinations with respect to the victim, one or more attorneys associated with the matter, a judge, and/or the like according to embodiments of the invention.

The use of third party databases in detecting undesired call activity according to embodiments of the invention provides functionality in addition to or in the alternative to determining the treatment of the call. For example, information with respect to detecting undesired call activity may be used for investigative and/or reporting purposes. According to embodiments, an investigator or other official associated with a prisoner's case is provided real-time notification with respect to the prisoner attempting to call a victim. Similarly, the victim may be notified of the prisoner's attempted call, although the actual call may have been blocked from the victim. Additionally or alternatively, a report detailing the attempted call may be generated according to embodiments of the invention, such as for completing a prisoner's file, for use at a parole hearing or other proceeding, etcetera.

Various call treatment responses are invoked in response to detecting undesired call activity based upon other available information according to embodiments of the invention. For example, a third party victim notification database may include information with respect to what events a victim desires notification regarding, a status of legal proceedings associated with the victim or the crime, etcetera. Having identified a call as being directed to a victim, embodiments of the invention analyze such other available information to determine if the call should be blocked, if the victim should be notified regarding the attempted call, if the police should be notified regarding the attempted call, if a report should be generated for use in an upcoming proceeding, if various privileges of the prisoner should be revoked, and/or the like.

Embodiments of the invention operate to control subsequent call treatment determinations based upon having detected a previous attempted undesired call activity. For example, once a call has been determined to have been attempted to a particular victim, future calls to the same geographic area, same telephone exchange, individuals having a same last name, etcetera may be determined to be undesired calls and thus may be blocked etcetera. Such subsequent call treatment with respect to these calls may be only with respect to a particular prisoner making the call, may be with respect to all calls made from a particular controlled environment facility, may be system wide, etcetera.

An advantage provided according to embodiments of the present invention is that controlled environment information management systems effectively and efficiently detect unauthorized or undesired calling activity, such as to control calls from inmates or other residents of controlled environment facilities to victims, judges, prosecuting attorneys, and the like. A further advantage provided according to embodiments of the present invention is that various call treatments are implemented using information from a third party database, wherein subsequent call treatment determinations are affected by such information.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Controlled environment facilities, such as inmate facilities, hospitals, nursing homes, and camps, may be thought of as a small community or city, perhaps walled or otherwise access restricted, wherein various activities occur within the community and between the community and those outside the community in the daily operation thereof. Such a community includes a number of individuals and enterprises directly associated therewith, including management, staff, and inmates, residents, patients, or guests (hereinafter referred to as residents), and a number of individuals and enterprises indirectly associated therewith, including friends and family of residents, vendors, government agencies, providers of services to residents, and individuals with a connection to the facility or its residents. Information is often exchanged and transactions are often conducted by, between, among, and on behalf of the aforementioned individuals and enterprises in performing the aforementioned daily activities.

It shall be appreciated that in such a controlled environment, there may be unique relationships, situations, and information which may be leveraged in providing management functions or in conducting transactions. For example, information flowing from residents may be monitored and/or processed in an intelligence area to ensure the safety and security of those within the controlled environment facility and those outside of the facility. Moreover, information with respect to individuals and/or enterprises having an interest in residents of the controlled environment facility may be utilized in facilitating transactions, such as toll telephone calls and the purchase of commissary items. Accordingly, preferred embodiments of the present invention provide integration of various functional aspects associated with a controlled environment facility to provide a robust information movement and management platform.

Figure 1:
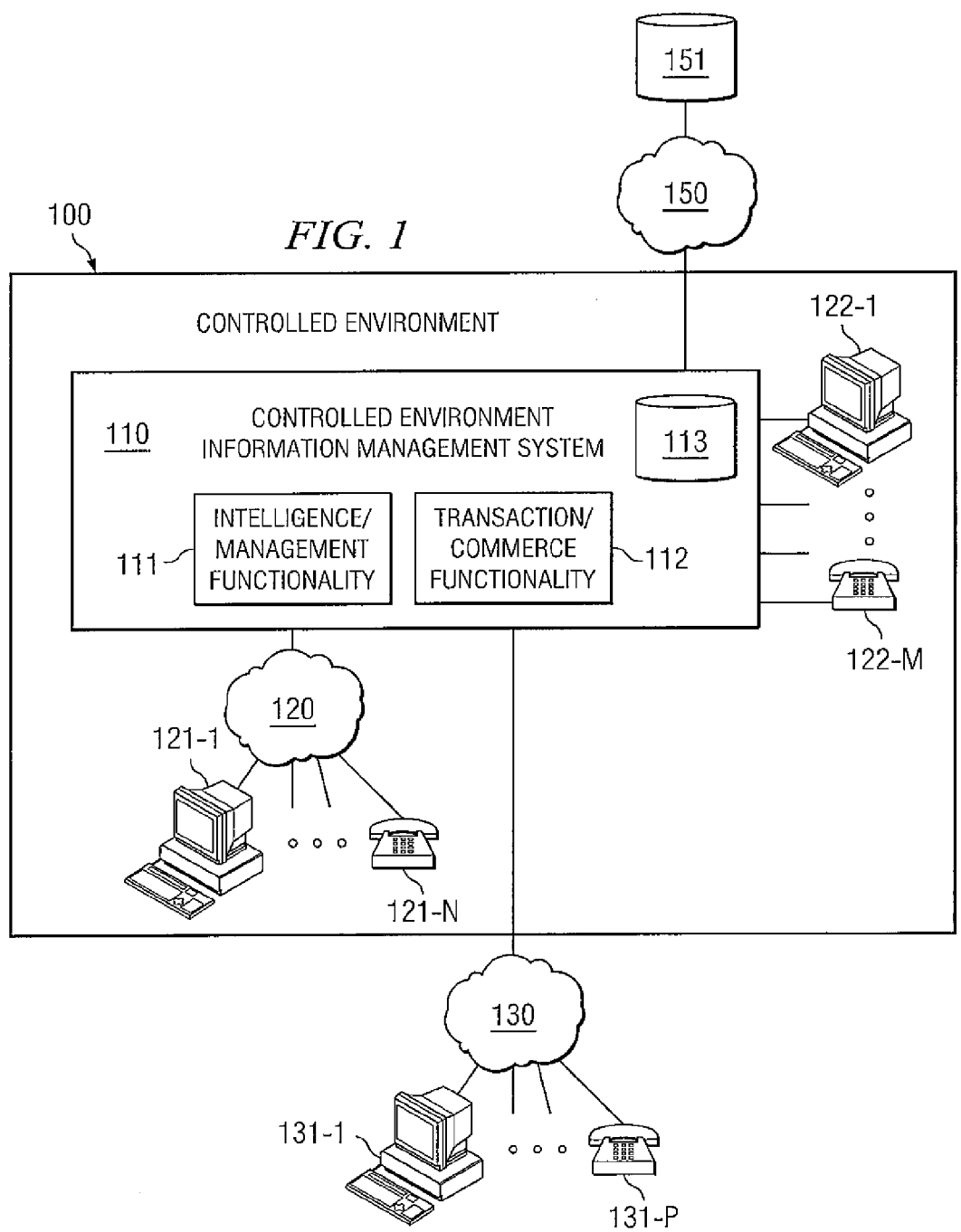
FIG. 1 shows a block diagram of a controlled environment information management system adapted according to an embodiment of the present invention.

Directing attention to FIG. 1, a controlled environment information management system of the present invention is shown according to a preferred embodiment to provide integrated management and movement of information and transaction and commerce facilitation within and associated with a controlled environment facility. Specifically, controlled environment information management system 110 is deployed in association with controlled environment facility 100. It should be appreciated that information management systems adapted according to embodiments of the present invention may be deployed for use with respect to a variety of controlled environment facilities, including inmate facilities (e.g., municipal jails, county jails, state prisons, federal prisons, military stockades, juvenile facilities, and detention camps), hospitals, nursing homes, camps, and the like.

Although illustrated as being deployed within the controlled environment facility in FIG. 1, it should be appreciated that controlled environment information management systems of the present invention may be deployed in a number of configurations. For example, embodiments of the present invention provide an information management system deployed external to the controlled environment facility and having data terminals and/or other access points deployed within the controlled environment facility. Additionally or alternatively, information management systems may be provided in a distributed topology, such as having server systems, application programs, and/or databases distributed throughout a number of geographic locals, according to embodiments of the present invention. Information management systems of the present invention may be coupled to other systems, whether internal or external to the controlled environment facility, including networks (such as the public switched telephone network (PSTN) and the Internet), databases (such as demographic databases, consumer account databases, historical records databases, victim notification databases, government databases, and judicial databases), and platforms (such as personal computers, computer networks, and even other information management systems of the present invention).

As shown in FIG. 1, information management system 110 may provide a number of access points coupled to a variety of user terminal equipment configurations. User terminal equipment utilized according to preferred embodiments of the present invention may include personal computers, personal digital assistants (PDAs), pagers, telephones (wireline and wireless), facsimile machines, and the like, coupled through direct links, such as wireline, cable, fiber optic, etcetera, and/or indirect links, such as network links, private branch exchange (PBX) links, etcetera. Accordingly, information management system 110 of the illustrated embodiment provides connectivity to user terminals 122-1 through 122-M disposed within controlled environment facility 100 via direct connections, user terminals 121-1 through 121-N disposed within controlled environment facility 100 via indirect connections (here comprising network or networks 120, referred to herein as network 120), and user terminals 131-1 through 131-P disposed external to controlled environment facility 100 via indirect connections (here comprising XML connections and/or network or networks 130, referred to herein as network 130).

In accordance with an embodiment of the present invention, controlled environment information management system 110 is adapted to include intelligence/management functionality 111 and transaction/commerce functionality 112. Preferably, intelligence/management functionality 111 provides for collection, storage, and movement of information for managing various operational aspects of the controlled environment facility, including the management of personnel, residents, vendors, and resources. Transaction/commerce functionality 112 preferably provides for the instigation and completion of various transactions, including requesting and providing goods and services, determining credit worthiness, verifying account balance and status, and providing for payment. The aforementioned functionality is preferably provided according to the present invention at any distance and at any time.

The illustrated embodiment of controlled environment information management system 110 comprises database 113. Preferably, database 113 stores information useful in "scoring" call attempts and/or other aspects of a call, such as implementation of particular calling services (e.g., call redirecting and three-way calling), by controlled environment information management system 110. Such scoring may be based upon active intelligence and/or organic information. Accordingly, database 113 may comprise information such as operating company numbers, account owner, originating line number screening, dialed number information, call detail records, line providers, alternative billing services, number portability, calling features, call history, law enforcement information, and/or the like.

Preferred embodiments of database 113 store information with respect to scoring call attempts and/or previous call treatment determinations. Such information may be utilized in performing subsequent call treatment determinations while optimizing resource utilization, such as through avoiding subsequent network queries with respect to a particular called number when a negative call treatment determination has been made within a period of time, e.g., a day, a week, or a month. Additionally or alternatively, information stored by database 113 may be utilized for statistical and/or trend analysis. For example, information with respect to call treatment determinations, called numbers, etcetera may be stored in association with individuals (e.g., indexed by personal identification number (PIN) or other unique identifier) for analysis.

The illustrated embodiment of controlled environment information management system 110 is in communication with an external third party database (e.g., public database, governmental database, private third party database, and/or the like) such as via network 150 (e.g., the PSTN, a cellular network, a PCS network, the Internet, a cable transmission system, a satellite communication system, electrically conductive transmission lines, fiber optic links, a LAN, a MAN, a WAN, an intranet, an extranet, and/or the like) for use in scoring call attempts or otherwise making call treatment determinations. For example, an external third party database utilized to obtain information for scoring call attempts comprises victim notification database 151, such as may comprise the VICTIM INFORMATION AND NOTIFICATION EVERYDAY (VINE®) and/or VINE PROTECTIVE ORDER databases maintained by Appriss, Inc., Louisville, Ky.

Database 113 may include a participation matrix useful in scoring of calls by transaction/commerce functionality 112. Negative and/or affirmative call treatment indicators and/or other scoring metrics may be correlated to data of particular variables which may be queried from other sources, such as victim notification database 151. Actual treatment of a particular call may be a function of participation matrix information. For example, calls from and/or to a particular individual, facility, area, etcetera are treated differently than calls from and/or to other individuals, facilities, areas, etcetera.

Scoring of calls by transaction/commerce functionality 112 may be relative to risk of collection of payment with respect to the call, relative to a determination that unauthorized, impermissible, or otherwise undesired call activity is likely being attempted, etcetera. Accordingly, transaction/commerce functionality 112 may provide positive and negative information and/or control signals with respect to setting up a call, continuing a call, etcetera in real time. Additionally or alternatively, transaction/commerce functionality 112 may provide information, whether positive or negative, for use with respect to future calls. Additional detail with respect to call scoring, determinations with respect to allowing a call to be made, metrics used in scoring a call, and the like are shown in the above referenced patent application entitled "Optimizing Profitability in Business Transactions," previously incorporated herein by reference.

Figure 2:
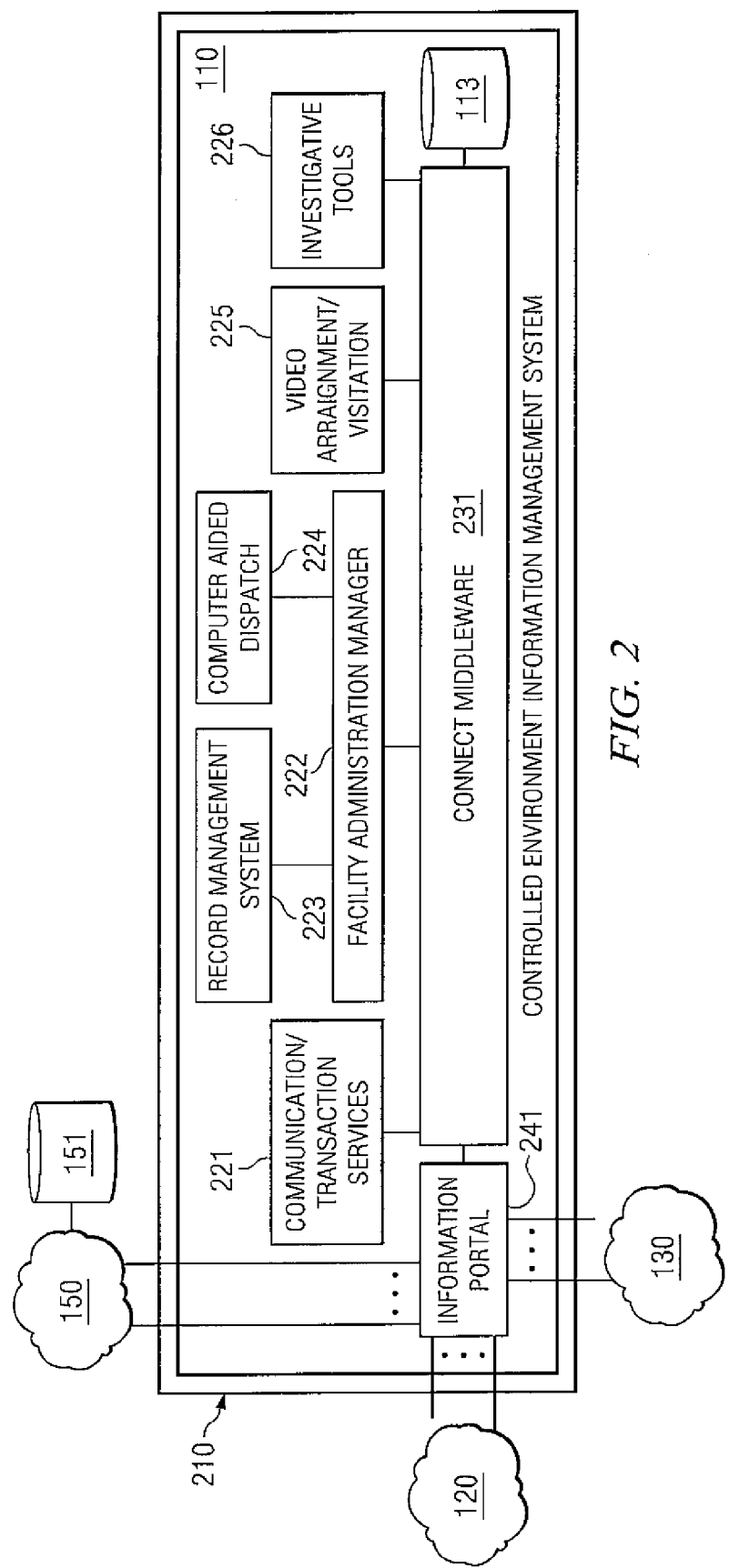
FIG. 2 shows a block diagram of an integrated controlled environment information management architecture according to an embodiment of the present invention.

Directing attention to FIG. 2, a preferred embodiment integrated architecture of an information management system of the present invention is shown. Specifically, information management system 110 is shown as including a plurality of vertical applications and modules useful therewith, including communication/transaction services 221, facility administration module 222, record management system 223, computer aided dispatch 224, video arraignment/visitation 225, and investigative tools 226, providing features and functions for providing desired management and transactions. For example, communication/transaction services 221 and/or video arraignment/visitation 225 may provide features and functions of transaction/commerce functionality 112. Similarly, facility administration module 222, record management system 223, computer aided dispatch 224, and/or investigative tools 226 may provide features and functions of intelligence/management functionality 111.

Also shown in the integrated architecture of FIG. 2 is a layer, connect middle-ware 231, providing interconnection with respect to vertical applications and modules 221-226. According to the preferred embodiment, connect middle-ware 231 provides voice, video and/or data integration among and between the aforementioned vertical applications and modules. Connect middle-ware 231 of the illustrated embodiment is coupled to information portal 241, providing external connectivity with respect the vertical applications and modules and/or other aspects of the information management system. For example, information portal 241 may provide information communication between any of vertical applications and modules 221-226 and users thereof, via connect middle-ware 231 and network 120, network 130, network 150, or any of a number of other links.

In addition to providing the aforementioned connectivity, information portal 241 of the preferred embodiment provides additional functionality related to information communication. For example, information portal 241 may provide for the collection of real-time call statistics. Similarly, information portal 241 may capture information related to a call or communication, such as automatic number identification (ANI) information, dialed number identification service (DNIS) information, communication routing information, information useful in determining call accounting records, commissions, or other related financial information, and the like. Additionally, information portal 241 is not limited to telephony communication and, therefore, may provide a data firewall, e-mail management, packet or other Internet destination routing, or like functionality useful with respect to data communication. Information portal 241 of embodiments of the invention provides interfacing with systems (e.g., other controlled environment facility information management systems, application servers, web servers, media servers, etcetera) and data (e.g., public databases, governmental databases, third party databases, etcetera) external to controlled environment information management system 110.

Referring still to FIG. 2, applications platform 210 of the illustrated embodiment serves as the base on which the integrated architecture of information management system 110 may be constructed as desired. For example, when implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etcetera. The computer data signal may include any signal that can propagate over a transmission medium such as electronic network channels, optical fibers, air, electromagnetic, RF links, etcetera. The code segments may be downloaded via computer networks such as the Internet, an intranet, etcetera.

Figure 3:
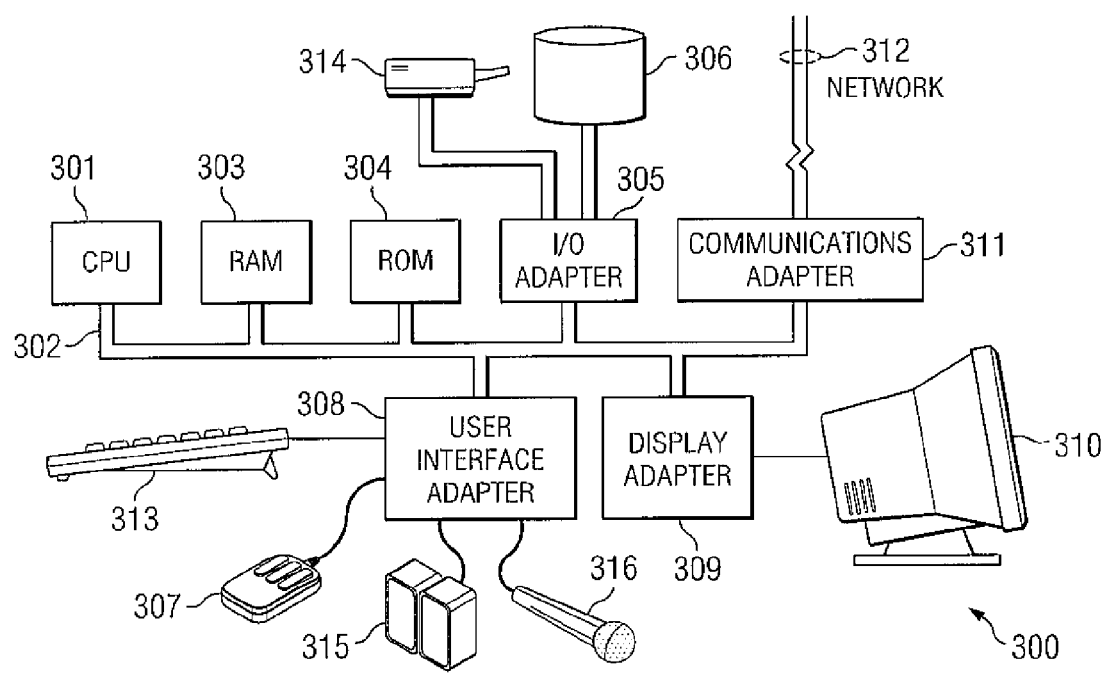
FIG. 3 shows a processor based system adapted to provide controlled environment information management according to an embodiment of the present invention.

FIG. 3 illustrates computer system 300 adapted to use the present invention, such as may correspond to platform 210 shown in FIG. 2. Central processing unit (CPU) 301 is coupled to system bus 302. The CPU 301 may be any general purpose CPU, such as a processor from the Intel PENTIUM processor family, or a Motorola POWERPC processor. However, the present invention is not restricted by the architecture of CPU 301 as long as CPU 301 supports the inventive operations as described herein. Computer system 300 may be operating under control of an operating system such as Microsoft WINDOWS NT, or other release of the WINDOWS operating system, UNIX, LINUX, and the like.

Bus 302 of computer system 300 is coupled to random access memory (RAM) 303, which may be SRAM, DRAM, or SDRAM. ROM 304 is also coupled to bus 302, which may be PROM, EPROM, or EEPROM. RAM 303 and ROM 304 hold user and system data and programs as is well known in the art. Bus 302 is also coupled to input/output (I/O) controller card 305, communications adapter card 311, user interface card 308, and display card 309. The I/O adapter card 305 connects to storage devices 306, such as one or more of a hard drive, a CD drive, a floppy disk drive, a tape drive, to the computer system. The I/O adapter 305 is also connected to printer 314, which would allow the system to print paper copies of information such as document, photographs, articles, etc. Note that the printer may a printer (e.g. dot matrix, laser, etcetera), a facsimile machine, or a copier machine. Communications card 311 is adapted to couple the computer system 300 to a network 312, which may be one or more of a telephone network, a LAN, a MAN, a WAN, the Internet, and/or the like. User interface card 308 couples user input devices, such as keyboard 313, pointing device 307, and microphone 316, to the computer system 300. User interface card 308 also provides sound output to a user via speaker(s) 315. The display card 309 is driven by CPU 301 to control the display on display device 310.

Referring to FIG. 2, communication/transaction services 221, utilized in providing telephone calling from and to inmates, and video arraignment/visitation 225, utilized in providing visitation of inmates by friends and family, may provide detailed information with respect to an inmate, his activities, and those he associates with and facility administration manager 221 may collect detailed information with respect to an inmate and their activities. Accordingly, information management system 110 of the preferred embodiment has access to very rich investigative information. For example, from analyzing calls placed through communication/transaction services 221, it may be known who is making a call, who is the called party, and the content of the call may even be monitored and/or recorded. Investigative tools 226 may log all the calls so that an investigator may research them through an archive. Additionally or alternatively, investigative tools 226 may be provided access to internal and/or external databases, such as victim notification database 151.

Having broadly described a controlled environment information management system according to a preferred embodiment of the present invention, deployment and operation thereof will be described with respect to an exemplary controlled environment facility to better aid the reader in understanding the concepts of the present invention. Specifically, deployment and operation of information management system 110 with respect to an inmate facility, e.g., a prison, is described below. Accordingly, aspects of information management system 110 as may be particularly adapted for use in an inmate facility is described. However, it should be appreciated that the present invention is not limited to the particular exemplary features and functionality described herein.

Figure 4:
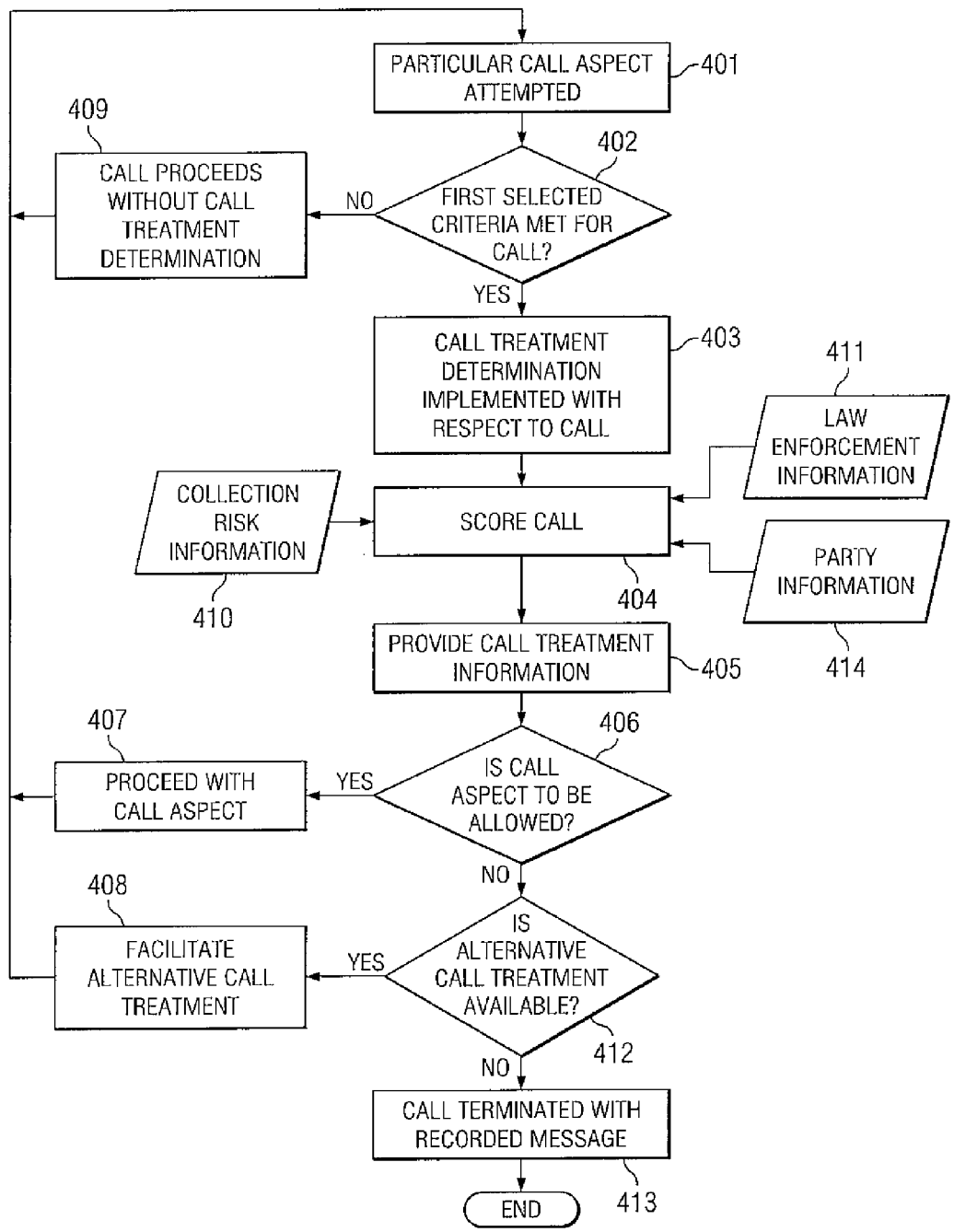
FIG. 4 shows a flow diagram of operation of a controlled environment information management system according to an embodiment of the present invention.

FIG. 4 illustrates preferred embodiment steps for call treatment by transaction/commerce functionality adapted according to the present invention. In operation according to the illustrated embodiment, a particular aspect of a call is attempted at step 401. For example, a user of user terminal 121-N (FIG. 1) may attempt to place a call to a particular number, such as that associated with user terminal 131-P (FIG. 1). Alternatively, a particular call aspect of a call already in progress may be attempted. For example, a call may be in progress between user terminals 121-N and 131-P and a user attempts to invoke a calling service such as three-way calling. Similarly, a call which is being setup between user terminals 121-N and 131-P may be automatically redirected to a different terminal because a user of user terminal 131-P has previously invoked call forwarding. A call which is being setup between user terminals 121-N and 131-P may initially be directed to a number other than that of user terminal 131-P, being redirected through a remote call forwarding calling service. Particular ones of such call aspects may be detected according to the present invention, such as to minimize unbillable/uncollectable revenue risk, to prevent utilization of particular calling aspects with respect to certain users, locations, lines, to provide security, etcetera.

Preferably a determination is made as to whether the call meets a first selected criteria for call intelligence processing according to the present invention. For example, call intelligence processing may be provided with respect to calls being placed to and/or from a particular number, line, location, etcetera, calls for which a particular aspect is being attempted, calls having been identified for call intelligence processing, and/or the like. For collect calls, calls made from correctional facilities, calls made from particular user terminals within a correctional facility, calls made on a 1010XXX or 900 service, or other basis where risk of collection is relatively high or security is an issue may be subject to call treatment determinations of the present invention.

It should be appreciated that determinations with respect to a first selected criteria being met for a call may include determinations of multiple orders. For example, it may first be determined that a call is a candidate for call intelligence processing and then the particular call aspect being attempted analyzed to determine if call intelligence processing is desired. Similarly, it may be determined that a call is a candidate for call intelligence processing and then local information, such as a previous positive or negative response from transaction/commerce functionality 112 associated with the current call in some way (e.g., line, number, location, etcetera) stored at database 113, analyzed to determine if call intelligence processing is desired.

According to the illustrated embodiment, if it is determined that the first selected criteria is not met with respect to the call, processing proceeds to step 409 wherein the call proceeds without call treatment determination according to an embodiment of the invention. Proceeding with respect to the call may encompass allowing the particular call aspect attempted to be implemented and, therefore, the call to proceed. Accordingly processing may again return to step 401 to identify subsequent attempts to implement a particular call aspect with respect to that call.

If, however, it is determined that the first selected criteria is met with respect to the call, processing according to the illustrated embodiment proceeds to step 403. At step 403 call treatment determination is implemented with respect to the call. For example, logic of transaction/commerce functionality 112 of FIG. 1 may be invoked to determine if the particular call aspect being attempted is to be allowed, denied, allowed with qualification, etcetera.

Transaction/commerce functionality 112 of the preferred embodiment scores the call for treatment according to the present invention at step 404. Such scoring may be based upon second criteria. For example, criteria used in call scoring according to preferred embodiments of the present invention may comprise information indicative of collection risk, e.g., operating company numbers, account owner, originating line number, dialed number information, call detail records, line providers, alternative billing services, number portability, call history, etcetera, (box 410). Additionally or alternatively, criteria used in call scoring according to preferred embodiments of the present invention may comprise information indicative of security risk, e.g., whether or not the call is to an inappropriate called party, whether or not the call is by an inappropriate calling party, whether or not to complete the call based upon legal restrictions, whether or not to monitor the call, etcetera, (boxes 411 and 414).

Transaction/commerce functionality 112 may utilize collection risk information 410 to determine that an acceptable risk of collecting fees is associated with a call being initiated (e.g., a collection risk score is acceptable, is within an acceptable range, is above or below a predetermined threshold, etcetera). Detail with respect to call scoring with respect to collection risk is shown in the above referenced patent application entitled "Optimizing Profitability in Business Transactions," previously incorporated herein by reference.

Additionally or alternatively, transaction/commerce functionality 112 may utilize law enforcement information 411 and/or party information 414 to determine that an acceptable security risk is associated with a call being initiated (e.g., security risk score is acceptable, is within an acceptable range, is above or below a predetermined threshold, etcetera). Security scoring according to embodiments of the invention may be binary, such as to provide a positive score or a negative score with respect to one or more security criteria, or may be graduated, such as to provide various scoring levels with respect to one or more security criteria.

For example, where transaction/commerce functionality 112 determines that a particular prisoner is attempting to initiate a call to the victim of the prisoner's crime, a negative score resulting in blocking the call attempt may result. However, where that same prisoner is attempting to initiate a call to a geographic area associated with the victim of the prisoner's crime, a score within a graduated scoring scale may be selected, which alone may or may not be sufficient to result in blocking the call attempt. Such a score may be used in combination with other scoring criteria in determining treatment with respect to the call. For example, the prisoner may have previously attempted to call the victim, may be known to have no friends or family within the geographic area, etcetera. This additional scoring criteria may be utilized in combination with the aforementioned criteria to provide a security risk score.

In scoring a call with respect to security risk, embodiments of the invention query one or more external third party database to obtain law enforcement information, party information (e.g., victim notification information), etcetera. Information utilized in providing a security risk score or otherwise in making a call treatment determination according to embodiments of the invention may include the particular crime an inmate is accused/convicted of, the temporal proximity to or from an event (e.g., an arraignment, a hearing, sentencing, service of legal papers, etcetera), the particular facility an inmate is detained within, the particular geographic area an inmate is calling, the particular number an inmate is calling, the particular telephone exchange an inmate is calling, the particular person an inmate is calling, information with respect to the particular person an inmate is calling, and/or the like.

For example, transaction/commerce functionality 112 may query victim notification database 151 at box 404 when an inmate is attempting to initiate a call to obtain party information 414, such as whether the called party is listed as a victim of a crime. Identification of the called party as a victim of a crime may comprise matching a telephone number stored in victim notification database 151 provided by a victim for notification of events, such as release of a particular prisoner, scheduling of a hearing for a particular prisoner, etcetera, to the inmate's dialed number. Accordingly, although the victim may provide and maintain the telephone number in victim notification database 151 for the purpose or receiving calls, such as notification of selected events, operation of embodiments of the present invention utilizes the information for determining call treatment (e.g., call blocking) with respect to a call placed to the victim.

Embodiments of the invention may operate to make security risk scoring or call treatment determinations based upon information in addition to or in the alternative to the aforementioned matching of telephone numbers. According to embodiments of the invention, security risk scoring or call treatment determinations may be made as a function of particular information associated with a victim, such as may be provided as collection risk information 410, party information 414 and/or law enforcement information 411.

For example, transaction/commerce functionality 112 may utilize billed name and address (BNA) information, such as may be obtained from a line information database (LIDB) with respect to collection risk scoring, to obtain a name of the called party. This name may be compared with names stored within victim notification database 151 to determine if an inmate is attempting to call a victim even where the dialed number does not correspond to a telephone number stored in victim notification database 151. Similarly, transaction/commerce functionality 112 may utilized BNA information to determine a geographic area or address being called. This information may be compared with geographic areas or addresses at which a victim or victim lives for use in providing security risk scoring or call treatment determinations. For example, an inmate calling an area in which a victim to a crime the inmate is accused or convicted of committing may have a high security risk score associated therewith and/or a call treatment determination may be to block the call.

Security risk scores or call treatment determinations may utilize various information in addition to or in the alternative to information identifying a caller or calling party or their locations. For example, a victim may provide information with respect particular events to be provided notification regarding for storage in victim notification database 151 which may be utilized according to embodiments of the invention. A victim may indicate a desire to receive notification of a hearing, such as a parole hearing, in order for the victim to attend the hearing, such as to provide testimony. Embodiments of the invention may utilize this information to adjust a security risk score (e.g., increase the likelihood a call blocking call treatment determination is made) during a period prior to the hearing (e.g., to decrease the likelihood that an inmate is able to influence the victim's testimony or attendance at the hearing).

The use of information in security risk scoring or call treatment determinations may be with respect to particular calls, particular calling parties, particular facilities, etcetera. For example, an inmate may be required to provide identification information, such as a PIN, such that transaction/commerce functionality 112 uniquely identifies the calling inmate. Party information 414 may not only identify a victim, but may also identify an individual accused or convicted of the crime associated with the victim. The aforementioned security risk scoring or call treatment determinations may take into account not only whether the call is directed to a victim, but also whether the calling inmate corresponds to an individual accused or convicted of the crime associated with the victim. However, because an inmate may solicit a compatriot to call the victim, security risk scoring or call treatment determinations according to embodiments may additionally or alternatively take into account whether the calling inmate is incarcerated in the same facility as an individual accused or convicted of the crime associated with the victim. Rather than making individual determinations with respect to a calling inmate, a particular facility from which a call is being placed, etcetera, embodiments of the invention may operate to block all calls made from any inmate facility to any victim identified in victim notification database 151.

A decision metric is preferably applied by transaction/commerce functionality 112 with respect to the aforementioned scores, e.g., collection risk score and security risk score, at box 405 in order to determine call treatment to be implemented with respect to the particular call aspect. A decision metric may comprise a determination as to whether the aggregate of any scores provided at box 404 indicate a particular call treatment should be implemented. For example, a call's score may be compared to a predetermined call blocking threshold to determine if the call should be permitted or blocked. Similarly, a call's score may be compared to various call treatment thresholds to determine a particular call treatment to be implemented. Accordingly, transaction/commerce functionality 112 may provide a raw score or a command determinative of how to treat the call based upon the scoring (step 405).

A call controller of transaction/commerce functionality 112 preferably receives the call treatment information provided at box 405 and controls the call accordingly (step 406). If the call treatment information indicates the particular attempted call aspect should be allowed, processing preferably proceeds to step 407 wherein transaction/commerce functionality 112 operates to allow/implement the call aspect. For example, if the call aspect was setting up of a call based upon a new call origination, call setup may be allowed to proceed to thereby place user terminal 121-N in communication with user terminal 131-P. Likewise, if the call aspect was a user invoking three-way calling (as may be detected using a technique as shown and described in U.S. Pat. Nos. 7,079,636 and 7,079,637, the disclosures of which are incorporated herein by references), call setup with respect to the third party may be allowed to proceed to thereby place user terminals 121-N and 131-P in communication with a third terminal (e.g. 131-1). Processing may again return to step 401 from step 407 to identify subsequent attempts to implement a particular call aspect with respect to that call.

If the call treatment information indicates the particular attempted call aspect should not be allowed, processing preferably proceeds to step 412 where a determination may be made as to whether an alternate call treatment is available. For example, where a call aspect is prevented due to a call score indicating an unacceptably high collection risk, alternative call payment techniques may be available to facilitate the call with acceptable risk. Accordingly, processing may proceed from step 412 when it is determined that alternate call treatment is available to step 408 wherein the alternative call treatment is facilitated. Processing may again return to step 401 from step 408 to identify subsequent attempts to implement a particular call aspect with respect to that call.

Processing may proceed from step 412 when it is determined that alternate call treatment is not available to step 413 wherein a recorded message is played to announce that the attempted call aspect will not be implemented and/or to announce that the call will be terminated. Thereafter, attempts to implement the attempted call aspect, or perhaps the call itself, may be terminated. Of course, there is no requirement that a message be played according to the present invention.

It should be appreciated that embodiments of the present invention may operate to proceed with particular call aspects in a particular way according to the call treatment information provided by call intelligence of the present invention. For example, call treatment information of the present invention may indicate that an attempted call aspect, such as setting up a new call, should be allowed in a substantially typical fashion, but that additional call processing, such as notifying a law enforcement agency of the call, recording the call, providing call detail information to a system for call accounting, and/or the like, should be accomplished according to the present invention. Accordingly, step 407 may operate to perform call processing in addition to or in the alternative to proceeding with the particular call aspect attempted in response to call treatment information of the present invention.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
performing, via one or more computer systems,
receiving an indication of a telephone call initiated by a resident of a controlled environment facility to a non-resident of the controlled environment facility;
receiving, from a third party database, information related to the non-resident, wherein said third party database is not configured for identifying undesired call activity;
identifying, based at least in part upon the obtained information, a security risk that the resident represents to the non-resident, the security risk including a security risk score; receiving a telephone billing name associated with the non-resident from a Line Information Database (LIDB); comparing the telephone billing name with a name of the non-resident as stored in the third party database: adjusting the security risk score based, at least in part, upon the comparison; and
determining whether to allow the telephone call based, at least in part, upon the security risk.

2. The method of claim 1, wherein said third party database comprises a victim notification database.

3. The method of claim 2, wherein said information comprises a victim's telephone number.

4. The method of claim 2, wherein said information comprises victim identification information.

5. The method of claim 1, wherein identifying the security risk includes calculating a security risk score based, at least in part, upon past call activity involving at least one of the resident or the non-resident.

6. The method of claim 1, wherein identifying the security risk includes calculating a security risk score based, at least in part, upon a temporal proximity between the telephone call and another event concerning at least one of the resident or the non-resident.

7. The method of claim 1, wherein identifying the security risk includes calculating a security risk score, and wherein determining whether to allow the telephone call includes comparing the security risk score to a threshold value.

8. A method comprising:
performing, via one or more computer systems,
receiving an indication of an initiation of a telephone call by an inmate within a controlled environment facility to an individual outside of the controlled environment facility;
receiving information associated with the individual from a victim notification database, the information "comprising a name of a victim";
calculating a security risk score based, at least in part, upon the received information, the security risk score related to a security risk that the inmate represents to the individual; and
making a call treatment decision with respect to said telephone call based, at least in part, upon the security risk score.

9. The method of claim 8, wherein said telephone call includes a three-way telephone call.

10. The method of claim 8, wherein said information associated with the individual comprises a telephone number.

11. The method of claim 8, wherein said information associated with the individual comprises identification of a victim.

12. The method of claim 8, wherein said information associated with the individual comprises identification of a legal representative.

13. The method of claim 8, wherein said information associated with the individual comprises identification of a judge.

14. The method of claim 8, wherein said information associated with the individual comprises a geographic region.

15. The method of claim 8, wherein receiving the information from the victim notification database includes accessing said victim notification database at a point of call validation or caller verification.

16. The method of claim 8, wherein making said call treatment decision comprises causing said telephone call to be blocked.

17. The method of claim 8, wherein making said call treatment decision comprises causing said telephone call to be allowed.

18. The method of claim 8, wherein making said call treatment decision comprises issuing a notification with respect to said initiation of said telephone call.

19. The method of claim 8, wherein calculating the security risk score further comprises:
performing, via the one or more computer systems,
comparing at least one portion of the information received from the victim notification database with other information received from a line information database; and
increasing the security risk score in response to a match between the at least one portion of the information and the other information.

20. The method of claim 8, wherein calculating the security risk score further comprises:
    performing, via the one or more computer systems,
        comparing at least a portion of the information received from the victim notification database with at least one of a telephone billing name or number information received from another database; and
        increasing the security risk score in response to a match between the at least one portion of the information and at least one of the telephone billing name or number information.

21. The method of claim 8, wherein calculating the security risk score further comprises:
    increasing the security risk score based, at least in part, upon a determination that another inmate within the controlled environment facility is accused or convicted of a crime associated with the individual.

22. The method of claim 8, wherein said security risk score is graduated.

23. The method of claim 21, wherein said making said treatment decision further comprises:
    performing, via the one or more computer systems,
        determining if said security risk score is above or below a predetermined threshold.

24. The method of claim 8, further comprising:
    performing, via the one or more computer systems,
        calculating the security risk score based, at least in part, upon the inmate's past calling activity.

25. The method of claim 8, further comprising:
    performing, via the one or more computer systems,
        calculating the security risk score based, at least in part, upon a crime the inmate is accused or convicted of.

26. The method of claim 8, wherein said security risk further comprising:
    performing, via the one or more computer systems,
        calculating the security risk score based, at least in part, upon a temporal proximity between the telephone call and an event associated with at least one of the inmate or the individual, the event selected from the group consisting of: an arraignment, a hearing, and a sentencing.

27. The method of claim 8, further comprising:
    performing, via the one or more computer systems,
        adjusting the security risk score based, at least in part, upon an identification of the controlled environment facility.

28. A system comprising:
    a memory; and
    a processor coupled to the memory and to a plurality of user terminals located within a controlled environment facility, the processor operable to:
        receive information from a database, the information corresponding to a party to a communication initiated via a given one of the plurality of user terminals operated by a resident of the controlled environment facility, the party being a non-resident of the controlled environment facility the party comprising a victim of a crime identified based, at least in part, upon said information from said database;
        calculate a graduated score based, at least in part, upon the received information, the graduated score indicating a security risk to the party; and
    control an aspect of the communication based, at least in part, upon the graduated score.

29. The system of claim 28, wherein said party comprises a legal representative identified based, at least in part, upon said information from said database.

30. The system of claim 28, wherein said party comprises a judge identified based, at least in part, upon as a function of said information from said database.

31. The system of claim 28, wherein database comprises a victim notification database.

* * * * *